C. FLETCHER.
HANDLE SHAPING MACHINE.
APPLICATION FILED AUG. 8, 1908.
955,639.
Patented Apr. 19, 1910.
4 SHEETS—SHEET 1.
Fig-1-
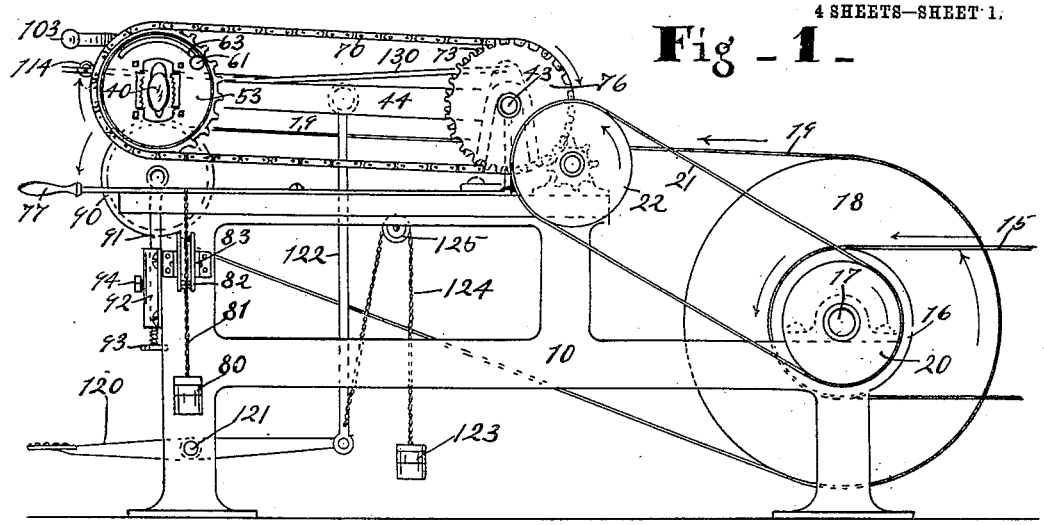
Fig-2-
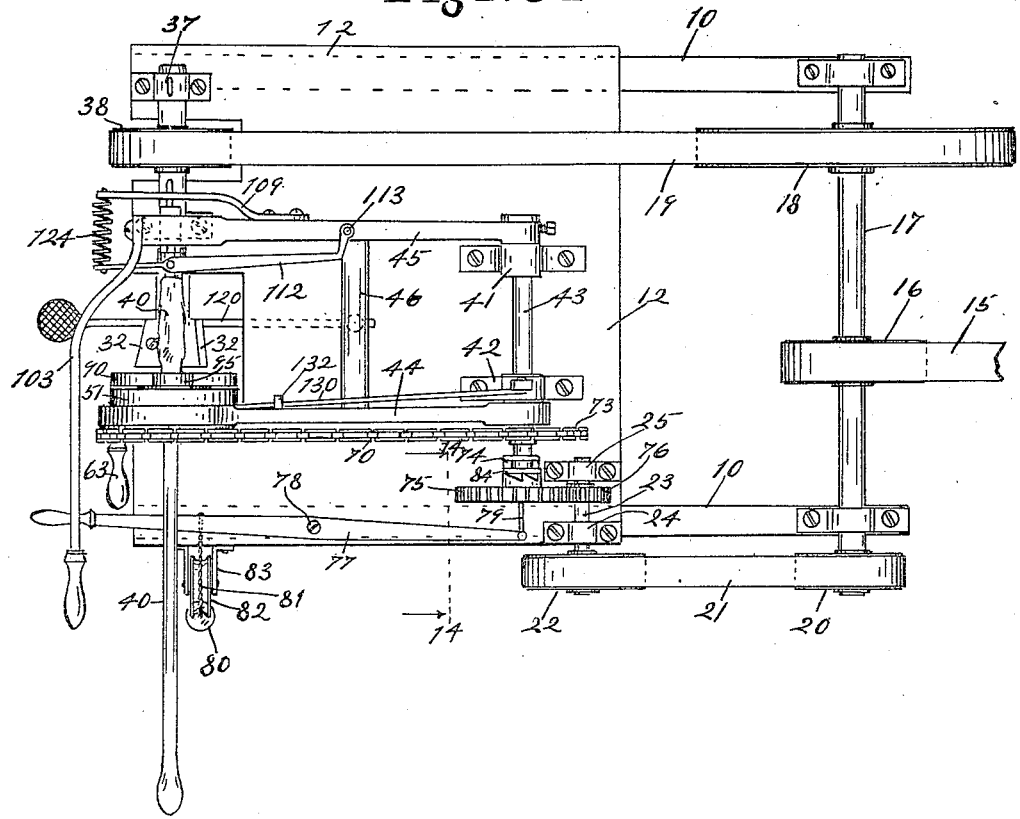
WITNESSES:
W. M. Gentle.
O. M. Greener
INVENTOR.
Clinton Fletcher.
BY
V. H. Lockwood,
ATTORNEY.

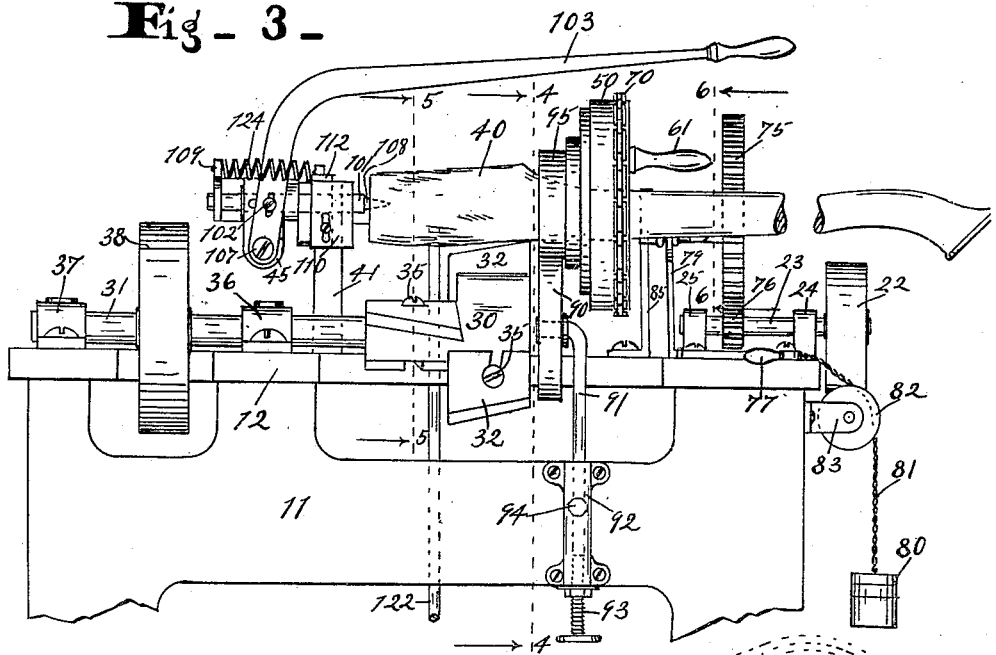

C. FLETCHER.
HANDLE SHAPING MACHINE.
APPLICATION FILED AUG. 8, 1908.
955,639.
Patented Apr. 19, 1910.
4 SHEETS—SHEET 3.
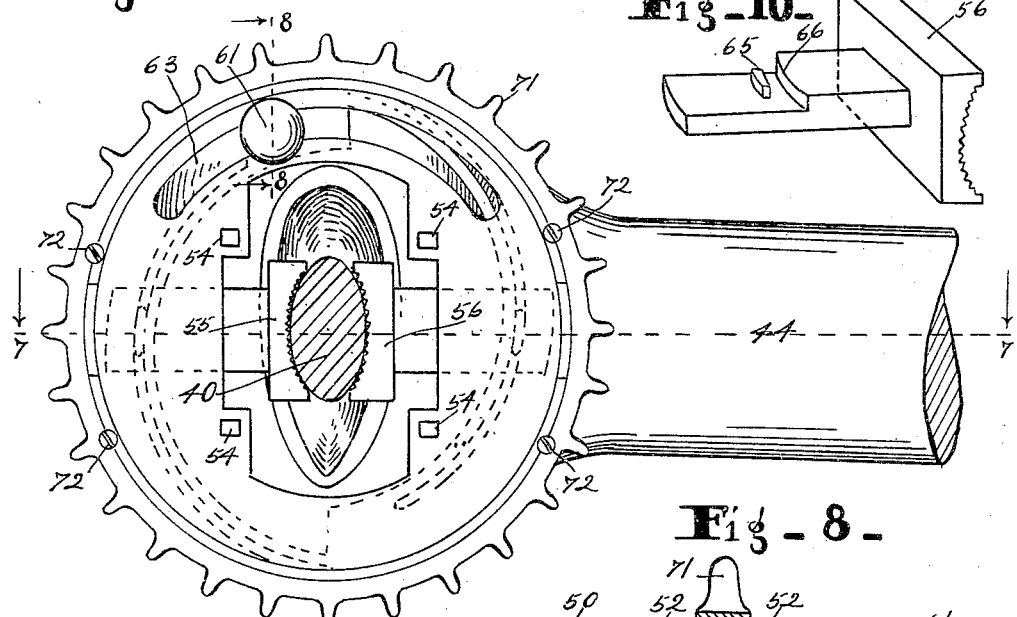
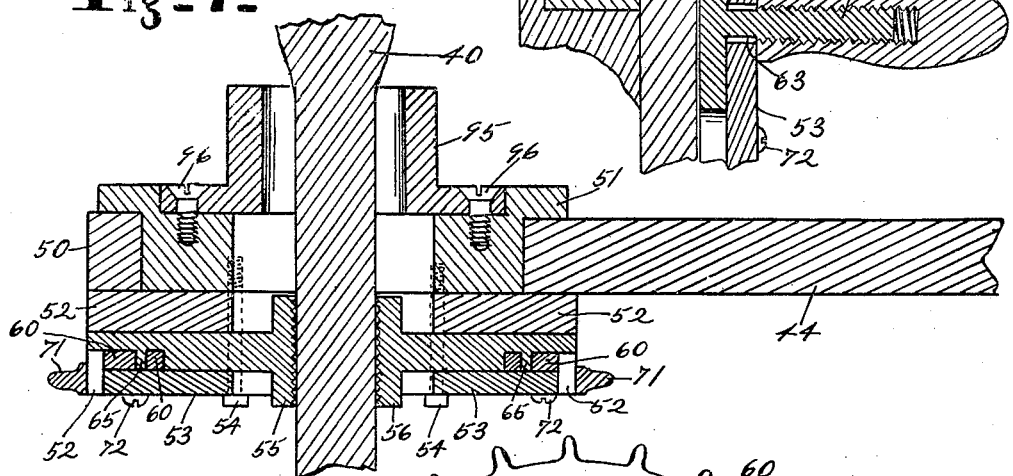
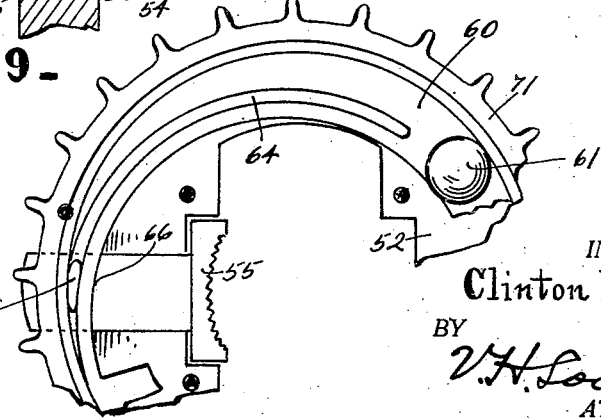
WITNESSES:
W. M. Gentle.
O. M. Greener
INVENTOR.
Clinton Fletcher.
BY
V. H. Lockwood.
ATTORNEY.

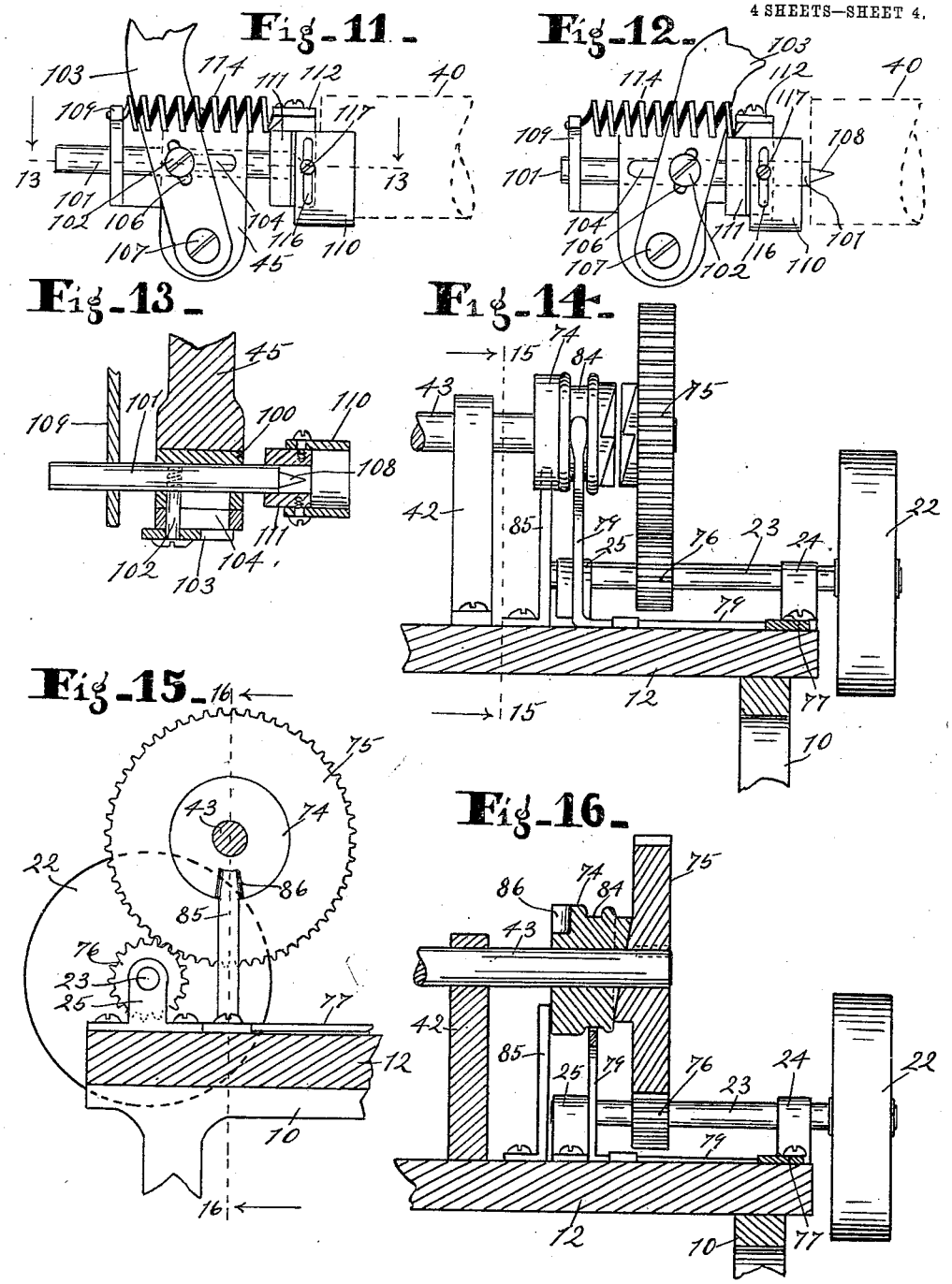

UNITED STATES PATENT OFFICE.

CLINTON FLETCHER, OF VEEDERSBURG, INDIANA, ASSIGNOR OF TWO-FIFTHS TO GRANT W. WARD, OF VEEDERSBURG, INDIANA.

HANDLE-SHAPING MACHINE.

955,639.  Specification of Letters Patent.  Patented Apr. 19, 1910.

Application filed August 8, 1908. Serial No. 447,533.

*To all whom it may concern:*

Be it known that I, CLINTON FLETCHER, of Veedersburg, county of Fountain, and State of Indiana, have invented a certain new and useful Handle-Shaping Machine; and I do hereby declare that the following is a full, clear, and exact description thereof, reference being had to the accompanying drawings, in which like numerals refer to like parts.

The object of this invention is to provide an improved machine for shaping and finishing the ends of ax handles and the like that enter the eye of the ax or tool, but while what is herein shown is designed particularly for use in shaping ax handles, the invention in many features is adaptable for shaping other handles.

One feature of the invention consists in providing a rotary shaping mechanism and rotary means for holding the handle that is movable toward or away from said shaping mechanism that rotates or rides on a rotatable disk and is thereby maintained in the proper position for the handle to be treated by the shaping mechanism. And in connection with this feature there is the further provision of a disk secured to said rotary handle holding mechanism adapted to surround the handle with the external periphery having the same shape as desired for the part of the handle to be treated and said disk being so mounted as to ride upon said last mentioned disk, whereby the handle, however irregular, will have its various surfaces brought successively in position to be treated by the cutting or shaping mechanism.

Another feature of the invention consists in the means for mounting said handle holding means and moving and driving the same so that it will by gravity be brought into operative position, and so that the handle holding means will be automatically stopped at the end of one revolution thereof, and also so that the handle holding means will be automatically maintained in an upward or unoperated position for the removal and insertion of handles.

The full nature of this invention will be understood from the following description and claim and the accompanying drawings.

In the drawings Figure 1 is an elevation of the right hand side of the machine. Fig. 2 is a plan view thereof. Fig. 3 is a front elevation of the upper part of the machine showing the ax handle in the machine centrally broken away. Fig. 4 is a vertical section of parts on the line 4—4 of Fig. 3, obscured parts being shown by dotted lines and the altered position of parts also being shown by dotted lines. Fig. 5 is a section on the line 5—5 of Fig. 3. Fig. 6 is a section on the line 6—6 of Fig. 3. Fig. 7 is a horizontal section on the line 7—7 of Fig. 6. Fig. 8 is a transverse section on the line 8—8 of Fig. 6. Fig. 9 is a portion of Fig. 6 with the outer plate removed and the remainder partly broken away. Fig. 10 is a perspective view of one of the handle clutch jaws. Fig. 11 is a side elevation of the means for holding the inner end of the ax handle, parts being broken away and the parts in position to initially receive the ax helve, the latter being shown by dotted lines. Fig. 12 is the same as Fig. 11 with the parts actuated in the final position for holding the ax handle. Fig. 13 is a section on the line 13—13 of Fig. 11. Fig. 14 is a section on the line 14—14 of Fig. 2. Fig. 15 is a section on the line 15—15 of Fig. 14. Fig. 16 is a section on the line 16—16 of Fig. 15.

The device shown in the drawings to illustrate the invention is provided with a substantially rectangular frame consisting of a side portion 10 and a front portion 11 and a top 12. The mechanism in general consists of three parts besides the frame, the driving means, the cutting means and the handle holding means.

Power is applied to the machine from any suitable source from the belt 15 to the driving pulley 16 on the shaft 17 that is mounted transversely at the rear part of the machine. It carries a large pulley 18 and belt 19 for driving the handle shaping means. The shaft 17 also carries a small pulley 20 which drives the belt 21 and runs to the pulley 22 on the short shaft 23 mounted in the bearings 24 and 25 on the table 12 and by this means the handle holding mechanism is operated.

The means for shaping, cutting and trimming the helve of the handle consists of the following mechanism. As seen in Figs. 3 and 5, the cutter or shaper is formed of a knife holder 30 secured on the shaft 31 and carrying a number of knives 32. The knife holder 30 of the cutter has at one end and for half the length thereof a pair of oppositely extending flanges 33 on which one pair of knives 32 are mounted, and at the other end for half the length of said knife holder there are a pair of oppositely projecting flanges 34 on which the other pair of knives 32 are mounted. Hence, each knife is substantially half the length of the knife holder. But the inner ends of said knives project somewhat beyond the middle of the knife holder so that they overlap each other as shown in Fig. 3. Each knife is held on the knife holder by a screw 35 that projects through an open slot in the knife whereby the knives are radially adjustable and thus adapted for shaping helves of different dimensions. The shaft 31 is mounted in the bearings 36 and 37 on the table 12 and carries a pulley 38 that is driven by the belt 19. In the machine herein shown this knife mechanism runs all the time.

Means for holding the ax handle 40 will now be described. On the table 12, as seen in Figs. 1 and 2, there are two bearing stands 41 and 42, in which the shaft 43 is mounted and to the ends of said shaft arms 44 and 45 are pivotally mounted so as to extend parallel therefrom and said arms 44 and 45 are rigidly connected by the transverse bar 46, so that the parts 44, 45 and 46 together constitute a frame oscillatable on the shaft 43 and the outer or free end of this frame carries the means for holding the ax handle.

The arm 44 carries a revoluble handle holding mechanism, as shown in Figs. 3 to 10. The outer end of said arm 44 is enlarged and made circular to form a ring bearing 50 for the rotary handle holding disks 51, 52 and 53, which are secured to each other side by side by bolts 54 running transversely through them. These three disks when secured together constitute practically one rotary means provided with a peripheral groove in which the ring bearing 50 lies and said disks are provided with transverse central apertures of uniform dimensions registering with each other through which the ax handle 40 extends. The handle is held centrally within said revolving holder by the clutches 55 and 56 with oppositely and radially extending shanks projecting through suitable sized radial apertures or recesses in the disk 52 and next to the disk 53, so that when the disk 53 is removed the clutches 55 and 56 can be removed. These clutches are radially operated, either to the gripping or releasing position by the ring plate 60 which is embedded in the space between plates 52 and 53 so as to be rotary and eccentric with said plates, the rotary movement being given by the handle 61 that is secured to said ring plate 60 and projects through a slot 63 in the plate 53. The ring plate 60 has two radially opposite and eccentric slots 64 into which the lugs 65 on the shanks of the clutches 55 and 56 project so that as the ring plate 60 is oscillated the clutches will be moved toward or away from each other. To resist the thrust of the clutches their shanks are provided with shoulders 66 which engage the inner periphery of the ring plate 60 which inner periphery is eccentric and consequently oscillation of the ring plate 60 in one direction forces the clutches against the ax handle and the thrust is resisted by the inner periphery of the ring plate 60, and when said ring plate 60 is reversed it, by acting on the lug 65, withdraws the clutches. When the ring plate 60 is moved into one position or the other it is clamped in place by the handle 61 which screws down on the threaded rod 68 that extends from the ring plate so that the handle 61 clamps against the surface of the disk 53. Therefore, when an ax handle is clamped in place by the clutches, the parts are locked by turning the handle 61 to its clamping position.

The ax handle and the disks and clutches for holding it, which have been described, are revolved by the sprocket chain 70 running over the sprocket wheel 71 which is secured on disk 52 by the screws 72 and the sprocket wheel 73 secured on shaft 43. The shaft 43 is driven by a clutch member 74 associated with the spur gear 75 which is driven by the pinion 76 on the shaft 23. The clutch is thrown into operation by the clutch lever 77 which is centrally fulcrumed at 78 on the table and is connected with the clutch by the clutch rod 79 that has a fork entering the recess 84 in the clutch member 74 as shown in Fig. 14. The clutch is held normally disengaged by the weight 80 on the cable 81 that runs over the pulley 82 mounted in the brackets 83 in the side of the frame.

In order to stop the actuating mechanism just described at the end of one revolution the post or stop arm 85 mounted on the table and which normally bears against the left hand surface of the clutch member 94 as shown in Fig. 16, engages with said clutch member in the notch 86, said clutch member being pushed to the left normally by the weight 80 so that at the end of one revolution of the clutch member 74, and after the lever 77 has been released, the arm 85 will engage the clutch 74 in the notch 86 and stop its rotation and the parts are so arranged that this stopping means will stop the handle holding means so that the clutches 55 and 56 will be vertically disposed for the reception of another handle.

To hold the helve in proper relation to the knives 32, the disk 90 is rotatably mounted, in line with the axis of the shaft 31, on the upper end of the vertically adjustable rod 91. The lower part of said rod is mounted in the tubular bracket 92 on the front 11 of the frame and the rod 91 being rendered vertically adjustable by the screw 93 that enters the lower end of the bracket 92. The rod 91 is set in adjusted position by the set screw 94. Upon this the irregularly formed disk 95 rides, said disk being secured to the side of the disk 51 by the screws 96, see Fig. 7. This disk 95 has an opening through it for the ax handle and its internal and external peripheries are of substantially the same form as the ax helve so that as the ax handle and holding means are revolved by the mechanism heretofore described the same will ride upon the disk 90 and the varying surfaces of the ax helve be brought down to the same level and line so that the knives will act thereon and cut or shape the helve to have the desired external conformation as predetermined by the external periphery of the disk 95. Hence, as this operation proceeds the frame composed of the arms 44, 45 and connection 46 will move up and down freely, the weight of said frame and of the parts in which the ax handle are mounted being sufficient to hold the ax handle always down to the knives.

The means for holding the extreme end of the ax helve is mounted in the free end of the arm 45 and is illustrated particularly in Figs. 2, 3, 11, 12 and 13. The purpose of this construction is chiefly to prevent the end of the ax handle from vibrating. In the end of the arm 45 there is a transversely disposed bearing plug 100 having an aperture or opening therethrough large enough to receive the bar 101 and permit the longitudinal sliding movement of said bar. Said bar is slidable and moved by the rod 102 which is rigidly secured to said arm and projects through the slot 106 in the hand lever 103 which is fulcrumed on the pin 107 in the end of the arm 45, see Fig. 11 and, is bent from a vertical to a horizontal position, as indicated in Fig. 2, so that it will be conveniently located for operation. The sliding movement of the bar 101 is limited by the ends of the slot 104 in the end of the arm 45 through which the pin or rod 102 extends and moves, as indicated in Figs. 12 and 13.

On the right hand end of the bar 101 there is a sharp point 108 which is adapted to penetrate the end of the ax helve as the bar 101 is moved to the right of the lever 103 and thus tends to hold the ax helve from vibration. A bar 109 is secured to the side of the arm 45, as shown in Fig. 2, and has an opening in it through which the bar 101 extends and by which it is guided.

To temporarily receive, support and hold the ax helve when it is first put in place, a U-shaped stirrup 110 is secured to the block 111 that is mounted on the under side of the bar 112, see Figs. 13 and 2, which is pivoted at 113 on pin 102. A spring 114 extends from the end of the bar 109 to the stirrup. The function of this spring 114 is to hold the stirrup 110 in normal position and so that when the bar 101 is forced to the right, as shown in Fig. 12, by the lever 103, the ax helve will disengage the stirrup. The stirrup has on each side a vertical slot 116, see Fig. 12, through which screw 117 from the block 111 projects. This permits the vertical adjustment of the stirrup to accommodate it to the desired position of the ax helve.

After the ax helve has been shaped and finished by the means heretofore described, the handle holding means and frame composed of bars 44, 45 and 46 are elevated to the dotted line position shown in Fig. 4, by means of the pedal 120 that is fulcrumed at 121 and on its inner end has a rod 122 pivoted that extends upwardly to the cross bar 46. To make the vertical movement of this frame and handle holding means easy, the weight 123 is suspended to the chain 124 that is connected to the lower part of the rod 122 and extends up from pulley 125 mounted on the under side of the table. When the handle holding means is thus elevated, the ax handles are moved by releasing the handle 61, and reversing the ring plate 60 so as to separate the clutches 55 and 56. For this purpose the handle holding means is held in its elevated position as shown by dotted lines in Fig. 4, by the rod 130 which is pivoted at one end to a projection 131 extending upwardly from one of the stands 42, see Fig. 4. The rod 130 projects through bearing block 132 secured to the arm 44 in a position for its free end to engage the notch 133 in the periphery of the disk 51. When the arm 44 is elevated to the dotted line position shown in Fig. 4, for holding the handle holding frame upward said rod 130 not only coöperates with the disk 51 but also with the sprocket chain and other means for holding said disk 51 from rotation, for if said disk were permitted to rotate, the rod 130 could not hold the parts in their elevated position after the pedal 120 was released.

The details of the operation will now be fully and orderly stated.

Assuming the handle holding means to be in the upward position, as shown by dotted lines in Fig. 4, and the handle holding clutches 55 and 56 to be separated, the first thing done is to insert an ax handle through the opening in the handle holding means mounted on arm 44 until the helve of the ax handle rests in the stirrup 110 carried by the other arm 45. Then by means of the handle 61 the ring plate 60 is revolved until the handle is clamped tightly by the clutches 55 and 56, whereupon the handle 61 is clamped down against the disk 53 in order to hold the clutches 55 and 56 tightly against the handle. The next step is to partially depress the hand lever 103 and therefore move the rod 101 to the right so as to force the point 108 into the end of the ax handle. When this has been done, the clutches 55 and 56 are again released by releasing the handle 61 and turning the ring plate 60 backwardly. Then the handle 103 is further depressed so as to move the parts from the position shown in Fig. 11 to that shown in Figs. 12 and 3. The further movement of the handle 103 forces the ax handle somewhat to the right so that the helve disengages the stirrup 110. Then the ax handle is finally clamped in position by turning the ring plate 60 and bringing clutches 55 and 56 against the ax handle and then clamping the parts in place by the handle 61. This completes the mounting of the ax handle ready to be treated. After the ax handle has thus been mounted in place in the handle holding means, the machine is thrown into operation by moving the clutch lever 77 to the left and as soon as this happens the disk 51 begins to revolve which causes it to disengage the rod 130 that is holding the handle holding means in its upward position, whereupon the latter descends by gravity until the irregularly formed disk 95 rides upon the disk 90 as shown in Figs. 3 and 4. The rotation of the knife mechanism proceeds with the simultaneous rotation of the ax helve and trims and smooths the ax helve into the desired shape during only one revolution of the handle holding means. It is understood that before the ax handle is inserted in the machine the helve has been approximately finished in form and the purpose of this machine is to perfectly, finally and completely shape and smooth it. As soon as this one revolution of the handle holding means occurs, it is stopped by the arm or post 85, seen in Fig. 16, as has been explained, and then the handle holding means is elevated by the pedal 120 and the rod 130 supports the handle holding means in the elevated position. Then by releasing the handle 61 and the ring plate 60 the clutches 55 and 56 will be disengaged from the handle and it is removed and another handle put in place and the process repeated as has been described. It is observed that the cutting and shaping mechanism and the handle holding mechanism are simultaneously rotated in the same direction, but at different speeds.

What I claim as my invention and desire to secure by Letters Patent is:

A handle shaping machine including a rotary shaping mechanism, a horizontally disposed frame fulcrumed at one end so as to be oscillatable, a rotary handle holding means on the free end of said frame adapted to be moved vertically into and out of operative position with relation to said shaping mechanism, means for elevating the free end of said frame, and a rod parallel with said frame and pivoted near the fulcrum of said frame with its free end slidably mounted in connection with said frame and adapted to engage the rotary part of said handle holding means when elevated, said rod engaging and holding said handle holding means from rotation when elevated, whereby said rod will hold said handle holding means in its elevated position, substantially as set forth.

In witness whereof, I have hereunto affixed my signature in the presence of the witnesses herein named.

CLINTON FLETCHER.

Witnesses:
H. M. BILLINGS,
E. E. WADE.